UNITED STATES PATENT OFFICE.

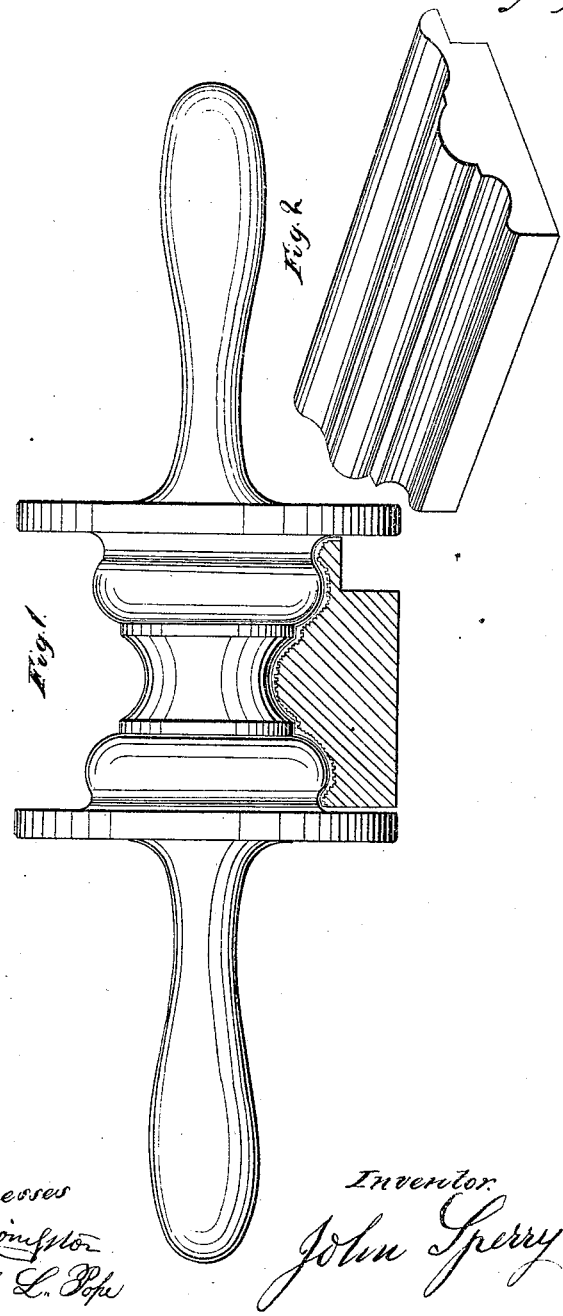

JOHN SPERRY, OF NEW YORK, N. Y., ASSIGNOR TO HIMSELF AND CALVIN W. SHERWOOD, OF SAME PLACE.

TOOL FOR ENAMELING PICTURE-FRAMES, &c.

Specification of Letters Patent No. 29,122, dated July 10, 1860.

*To all whom it may concern:*

Be it known that I, JOHN SPERRY, of New York, in the county and State of New York, have invented a new and useful Tool for Enameling Moldings for Picture-Frames, &c.; and I do hereby declare that the following is a full, clear, and exact description thereof, reference being had to the accompanying drawings, making part of this specification, in which—

Figure 1 represents a side view of the improved tool applied to a molding to show the manner it accomplishes its work. Fig. 2 is a perspective view of a portion of the finished molding.

This invention is intended for spreading the enameling composition on wood moldings for picture frames etc., so as to obtain a smooth and even surface for gilding.

It consists in the employment of cylindrical rollers, constructed and shaped with reference to the size and shape of the molding they are intended to be used upon said rollers having handles projecting from each end, that guide them in their movements over the molding; and also by which they are rolled and controlled as will be hereinafter described and represented.

To enable those skilled in the art to fully understand my invention I will proceed to describe its construction and operation.

The drawings fully illustrate the roller and its application to a molding of its form, reversed, that is to say, where there are beads or prominences on the molding there will be corresponding depressions on the roller; the two flanges or rims on each end of the roller project out a suitable distance and serve to spread the enameling composition on the edges or sides of the molding if necessary.

For each different size or style of molding there should be a roller constructed to conform to its surface, and each roller should be provided with two handles so that it may be moved about with facility over the surface of a molding without sliding on the surface.

The manner of using the roller is to spread the putty—"gilder's putty"—on the surface of the molding; then with the roller it is spread over the surface evenly and uniformly, as represented in Fig. 1, by simply passing the roller back and forth over the molding in a direction with its length, holding on at the same time to each handle and giving sufficient pressure to have a smooth solid surface which, when dry, will be ready to receive the preparation for gilding.

The drawing represents the surface of the molding stepped or cut with longitudinal angularities, on its surface. This is occasioned by the peculiarly constructed cutter used in producing the molding, and is an advantage to moldings for this purpose, as an increased surface is obtained, and consequently the enameling composition will adhere with greater tenacity than where it is put on a smooth surface free from asperities.

The advantage of this method of preparing over all others before known is that this tool always presents a correct working surface and will roll down the enamel put on without scraping it off; while in the old method the enamel is scraped down by the edge of a thin plate held perpendicular to the surface to be molded, causing most of the enamel laid on to be forced or scraped off, and requiring a greater number of coats to complete the process.

My tool being cylindrical and revolving obviates the difficulties common to the preparing tools now in use, which are made from plates of metal or wood with the enameling end the reverse of the form to be prepared and these, unless kept precisely perpendicular to the enameling surface will produce a different form from that intended.

Having thus described my invention, what I claim as new, and desire to secure by Letters Patent, is—

A cylindrical roller having the form of the surface to be enameled made in bas-relief around its circumference, substantially in the manner and for the purposes herein set forth.

JOHN SPERRY.

Witnesses:
J. H. SCOTT,
M. M. LIVINGSTON.